United States Patent
Ito et al.

(10) Patent No.: US 7,358,208 B2
(45) Date of Patent: Apr. 15, 2008

(54) DIELECTRIC CERAMIC COMPOSITION AND ELECTRONIC DEVICE

(75) Inventors: Kazushige Ito, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 18 days.

(21) Appl. No.: 11/332,124

(22) Filed: Jan. 17, 2006

(65) Prior Publication Data
US 2006/0160693 A1    Jul. 20, 2006

(30) Foreign Application Priority Data
Jan. 20, 2005  (JP) .............................. 2005-012820

(51) Int. Cl.
C04B 35/468  (2006.01)
C04B 35/47   (2006.01)
H01G 4/06    (2006.01)

(52) U.S. Cl. ................... 501/138; 501/139; 361/321.4

(58) Field of Classification Search ................. 501/137, 501/138, 139
See application file for complete search history.

(56) References Cited

U.S. PATENT DOCUMENTS 6,556,422 B2 *  4/2003  Kim et al. ............... 361/321.2
6,559,084 B1 *  5/2003  Fujikawa et al. ........... 501/139
6,809,052 B2 * 10/2004  Horie et al. ................. 501/138
6,829,137 B2 * 12/2004  Konaka et al. .......... 361/321.4
6,876,538 B1 *  4/2005  Kim et al. ............... 361/321.4
6,960,547 B2 * 11/2005  Matoba et al. .............. 501/139

FOREIGN PATENT DOCUMENTS

JP    A 2004-214539    7/2004

* cited by examiner

Primary Examiner—Karl E Group
(74) Attorney, Agent, or Firm—Oliff & Berridge, PLC

(57) ABSTRACT

A dielectric ceramic composition comprising a predetermined main component and a fifth subcomponent including an oxide of A (note that A is at least one king selected from a cation element group having an effective ionic radius of 0.065 nm to 0.085 nm at the time of 6 coordination); and the dielectric ceramic composition comprises a plurality of crystal grains including Ca elements and, when assuming that an average value of a concentration of entire Ca exiting in said respective crystal grains is grain Ca concentration, at least unevenness exists in said grain Ca concentration between said crystal grains and it is 5% or higher in a CV value.

12 Claims, 1 Drawing Sheet

DIELECTRIC CERAMIC COMPOSITION AND ELECTRONIC DEVICE

BACKGROUND OF THE INVENTION

1. Field of the Invention

The present invention relates to a dielectric ceramic composition having reduction resistance and an electronic device, such as a multilayer ceramic capacitor, using the dielectric ceramic composition.

2. Description of the Related Art

A multilayer ceramic capacitor as an electronic device is widely used as a highly reliable compact electronic device having a large capacity and by a large number in one electronic apparatus. In recent years, as the apparatuses become more compact and higher in performance, demands for a multilayer ceramic capacitor to be more compact with a larger capacity, low at cost and higher in reliability have become still stronger.

A multilayer ceramic capacitor is normally produced by using internal electrode layer paste and dielectric layer paste, stacking them by using a sheet method or a printing method, etc. and co-firing internal electrode layers and dielectric layers in an obtained stacked body.

As a conductive material of the internal electrode layers, Pd and a Pd alloy are generally used, but due to the high price thereof, relatively inexpensive base metals, such as Ni and a Ni alloy, have come to be used. When using a base metal as a conductive material of internal electrode layers, the internal electrode layers are oxidized when fired in the air. Therefore, co-firing of the dielectric layers and internal electrode layers has to be performed in a reducing atmosphere. However, when fired in a reducing atmosphere, the dielectric layers are reduced and the specific resistance declines. Thus, reduction-resistant dielectric materials have been developed.

However, a multilayer ceramic capacitor using a reduction-resistant dielectric material has disadvantages that a decline of IR (insulation resistance) due to an application of an electric field is remarkable, the IR lifetime is short and the reliability is low.

Capacitors are also required to have preferable capacity-temperature characteristics and, particularly, required to have a flat temperature characteristic of the capacity under a severe condition depending on the use object. In recent years, multilayer ceramic capacitors have come to be used in a variety of electronic apparatuses, such as an engine electronic control unit (ECU) to be installed in an engine room of vehicles, a crank angle sensor and an Anti Lock Brake System (ABS) module. Since these electronic apparatuses are for stable engine controlling, drive controlling and brake controlling, preferable temperature stability of the circuit is required.

Environments of using the electronic apparatuses are expected to become about −20° C. or lower in winter in cold climates and about +130° C. or higher after the engine starts in summer. Recently, there is a tendency of reducing a wire harness for connecting the electronic apparatus and an apparatus to be controlled thereby and the electronic apparatus may be provided outside of a vehicle, therefore, environments for the electronic devices have been getting more severe. Accordingly, a capacitor used by the electronic apparatuses is required to have flat temperature characteristics in a wide temperature range. Specifically, it is not sufficient when the capacity-temperature characteristics only satisfy the X7R characteristic of EIA standard (−55 to 125° C. and $\Delta C/C$=within ±15%), and a dielectric ceramic composition satisfying the X8R characteristics of EIA standard (−55 to 150° C. and $\Delta C/C$=within ±15%) is required.

As a dielectric ceramic composition satisfying the X8R characteristics, for example, the Japanese Unexamined Patent Publication No. 2004-214539 discloses a dielectric ceramic composition having a predetermined composition and unevenness of average Ca concentration in crystal grains between the crystal grains is 5% or higher when expressed in a CV value. The dielectric ceramic composition described in the publication satisfies the X8R characteristics, and capacity-temperature characteristic exhibited a usable property in a range of −55 to 150° C. However, the dielectric ceramic composition in the publication has a disadvantage of having poor insulation resistance (IR) temperature dependency and, for example, the insulation resistance (IR) declines in a high temperature environment, so that it becomes difficult to use it under high temperature. Furthermore, the dielectric ceramic composition in this publication has a disadvantage of having poor TC bias characteristics.

SUMMARY OF THE INVENTION

An object of the present invention is to provide a dielectric ceramic composition having high specific permittivity, capable of maintaining an insulation resistance lifetime and DC bias characteristics (dependency of the permittivity when applied with a direct current voltage), having capacity-temperature characteristics satisfying the X8R characteristics (−55 to 150° C. and $\Delta C/C$=within ±15%) of the EIA standard, able to be fired in a reducing atmosphere, and having improved TC bias characteristics (capacity-temperature characteristics when applied with a direct current voltage) and IR temperature dependency. Another object of the present invention is to provide an electronic device, such as a multilayer ceramic capacitor, particularly able to be formed compact and to have thinner layers and capable of realizing a compact body with a larger capacity by using the dielectric ceramic composition as above.

To attain the above object, according to the present invention, there is provided a dielectric ceramic composition, comprising a main component including Ba, Ca and Ti and having a perovskite crystal structure expressed by a general formula $ABO_3$, and a fifth subcomponent including an oxide of A (note that A is at least one kind selected from a cation element group having an effective ionic radius of 0.065 nm to 0.085 nm at the time of 6 coordination):

wherein the dielectric ceramic composition is composed of a plurality of crystal grains including Ca elements; and when assuming that an average value of a concentration of entire Ca exiting in said respective crystal grains (an average value of a solid solution amount of Ca) is grain Ca concentration, at least unevenness exists in said grain Ca concentration between said crystal grains and it is 5% or higher in a CV value.

In the present invention, a dielectric ceramic composition comprising a main component having a predetermined composition and a fifth subcomponent including an oxide of a certain element having an ionic radius of 0.065 mm to 0.085 nm, wherein unevenness of grain Ca concentration between the crystal grains is in the predetermined range as above.

Consequently, the specific permittivity is high, the insulation resistance lifetime and the DC bias characteristics can be maintained, the capacity-temperature characteristics can satisfy the X8R characteristics, and the TC bias characteristics and the IR temperature dependency can be improved.

In the present invention, the "IR temperature dependency" is an index for assessing how the insulation resistance IR changes against temperature change. The IR temperature dependency can be evaluated by calculating a change rate of IR at a predetermined temperature (for example, 150° C.) changed from IR at a reference temperature (for example, 25° C.). The smaller the IR change rate between a plurality of temperatures, the more preferable the IR temperature dependency is, while, the larger, the poorer.

For example, even when the capacity-temperature characteristics satisfy the X8R of the EIA standard, if the IR temperature dependency in a temperature range of the X8R (particularly, from the room temperature to the high temperature range) is poor, reliability particularly in the high temperature range declines and the practical use as a product becomes difficult. Therefore, excellent IR temperature dependency is a significant index for accessing particularly whether the capacitor can be stably used in a high temperature range or not.

In the present invention, the room temperature (25° C.) and a high temperature part (150° C.) are used as examples of the plurality of temperatures, and when assuming that insulation resistance at the respective temperatures are $IR_{25}$ and $IR_{150}$, the IR temperature dependency is evaluated to be good or bad by calculating values of "a loss of significant digits of IR" expressed by the formula (1) below.

$$\log(IR_{150}/IR_{25}) \quad (1)$$

Particularly, in the present invention, the main component has a predetermined composition, unevenness of grain Ca concentration between the crystal grains is in the predetermined range as above and, moreover, a fifth subcomponent composed of a specific element group is added. Therefore, the dielectric ceramic composition according to the present invention satisfies the X8R characteristics and the IR temperature dependency from the room temperature (25° C.) to the high temperature part (150° C.) can be improved. Specifically, the loss of significant digits of IR expressed by the above formula (1) can be −3.00 or higher.

In the present invention, preferably, the unevenness of grain Ca concentration between the crystal grains is preferably 5% or larger but smaller than 20%, and more preferably 10% or larger and 18% or smaller. When the CV value of grain Ca concentration between the crystal grains is too large, the temperature dependency of the capacitance tends to decline.

In the present invention, unevenness of grain Ca concentration between the crystal grains is evaluated by a CV value calculated by the method below.

Namely, first, grain Ca concentration as an average value of the concentration of entire Ca exiting in the respective crystal grains composing the dielectric composition is measured. Next, an average value "x" of grain Ca concentration between the crystal grains and a standard deviation of grain Ca concentration are calculated. Then, the evaluation is made by a CV value obtained from the average value "x" and the standard deviation a by the formula (2) blow.

$CV$ value [%]=(standard deviation σ of grain $Ca$ concentration/average value "$x$" of grain $Ca$ concentration)×100 (2)

In the present invention, a content of the fifth subcomponent (subcomponent including an oxide of A) is prefer- ably larger than 0 mole and smaller than 4 moles in terms of an oxide of A with respect to 100 moles of the main component, and more preferably 0.5 mole or larger and 3.0 moles or smaller. When the content of the fifth subcomponent is too large, a CV value of grain Ca concentration between the crystal grains becomes too large and temperature dependency of the capacitance tends to decline. On the other hand, when the fifth subcomponent is not included, the TC bias characteristics and the IR temperature dependency decline.

An oxide of A included in the fifth subcomponent is not particularly limited and may be any of oxides of cation elements having an effective ionic radius of 0.065 to 0.084 nm at the time of 6 coordination, but it is preferably at least one kind of oxide selected from an oxide of Al, an oxide of Cr, an oxide of Ga and an oxide of Ge. Among them, at least one kind of oxide selected from an oxide of Al, an oxide of Ga and an oxide of Ge is particularly preferable, and an oxide of Al is the most preferable.

In the present invention, a content of Ca elements in the dielectric ceramic composition is preferably 30 moles or smaller, more preferably 15 moles or larger and 25 moles or smaller, and furthermore preferably 17 moles or larger and 22 moles or smaller with respect to 100 moles of the $ABO_3$.

In the present invention, preferably, the dielectric ceramic composition furthermore comprises a first subcomponent including at least one kind selected from MgO, CaO, BaO and SrO;

a second subcomponent functioning at least as a sintering auxiliary;

a third subcomponent including an oxide of Mn; and a fourth subcomponent including an oxide of R (note that R is at least one kind selected from Sc, Y, La, Ce, Pr, Nd, Pm, Sm, Eu, Gd, Tb, Dy, Ho, Er, Tm, Yb and Lu).

When the above first to fourth subcomponents are furthermore included, the electric characteristics can be furthermore improved while maintaining the X8R characteristics.

In the present invention, preferably, the second subcomponent is a compound including oxide silicon as a main component, and more preferably, at least one kind selected from $SiO_2$, MO (note that M is at least one kind of element selected from Ba, Ca, Sr and Mg), $Li_2O$ and $B_2O_3$.

In the present invention, preferably, ratios of the first to fourth subcomponent with respect to 100 moles of the main component are first subcomponent: 0.1 to 3 moles, second subcomponent: 2 to 10 moles, third subcomponent: 0.1 to 2.5 moles, and fourth subcomponent: 0.1 to 14 moles (note that the number of moles of the fourth subcomponent is a ratio of R alone).

In the present invention, preferably, the dielectric ceramic composition comprises 0.01 to 0.5 mole of a sixth subcomponent including at least one kind selected form $V_2O_5$, $MoO_3$ and $WO_3$ with respect to 100 moles of the main component. By being added with the fifth subcomponent and first to fourth subcomponents and, moreover, including the sixth subcomponent, the capacity-temperature characteristics at the Curie's temperature or higher can be flattened and the IR lifetime can be improved.

A production method of the dielectric ceramic composition of the present invention is a method for producing any one of the above dielectric ceramic compositions and comprises A step of mixing materials of the main component and materials of the fifth subcomponent for preparing powder to be subjected to calcine, and a step of performing calcining on the prepared powder.

In the production method of the present invention, by adopting a step of preliminarily firing materials of the main component and materials of the fifth component in advance, the TC bias characteristics and the IR temperature dependency can be furthermore improved. Note that the calcining may be performed by adding other subcomponents (for example, a part of the first to fourth subcomponents, etc.) in addition to the main component and the fifth subcomponent.

In the production method of the present invention, a condition of the calcining is a calcining temperature of preferably 500 to 1000° C. and calcining time of preferably 2 to 6 hours. When the calcining temperature is low or the calcining time is short, effects of the calcining tend to become insufficient. On the other hand, when the calcining temperature is too high or when the calcining time is too long, the CV value of grain Ca concentration between the crystal grains becomes too large and the capacity-temperature characteristics tend to decline.

An electronic device according to the present invention includes dielectric layers composed of the above dielectric ceramic composition. As the electronic device, while not particularly limited, a multilayer ceramic capacitor, piezoelectric device, chip inductor, chip varistor, chip thermistor, chip resistor, and other surface mounted chip electronic devices (SMD) may be mentioned.

A multilayer ceramic capacitor according to the present invention is configured by alternately stacking dielectric layers composed of the dielectric ceramic composition as above and internal electrode layers.

In the present invention, by using the dielectric ceramic composition of the present invention as the dielectric layers, it becomes easy to provide an electronic device, such as a multilayer ceramic capacitor, having excellent characteristics. Also, by using the dielectric ceramic composition according to the present invention, even when the dielectric layers are made thinner, it is possible to satisfy the X8R characteristics and, moreover, to improve the TC bias characteristics and IR temperature dependency. Accordingly, the multilayer ceramic capacitor and other electronic device can realize a compact body with a large capacity and easily respond to a furthermore compact body and thinner layers. Therefore, mounting on a highly integrated circuit becomes easier.

Note that an ionic radius described in this specification is a value based on the article "R. D. Shannon, Acta Crystallogr., A32,751 (1976)".

According to the present invention, it is possible to provide a dielectric ceramic composition having a high specific permittivity, capable of maintaining an insulation resistance lifetime and DC bias characteristics, and improving TC bias characteristics and IR temperature dependency, wherein the capacity-temperature characteristics can satisfy the X8R characteristics.

Furthermore, according to the present invention, it is possible to provide an electronic device, such as a multilayer ceramic capacitor, having the above characteristics and capable of being formed compact and to have a large capacity as a result of using the dielectric ceramic composition of the present invention as the dielectric layers.

BRIEF DESCRIPTION OF DRAWINGS

Below, embodiments of the present invention will be explained in detail based on the drawing, in which.

DESCRIPTION OF THE PREFERRED EMBODIMENT

Multilayer Ceramic Capacitor 1

Figure 1:
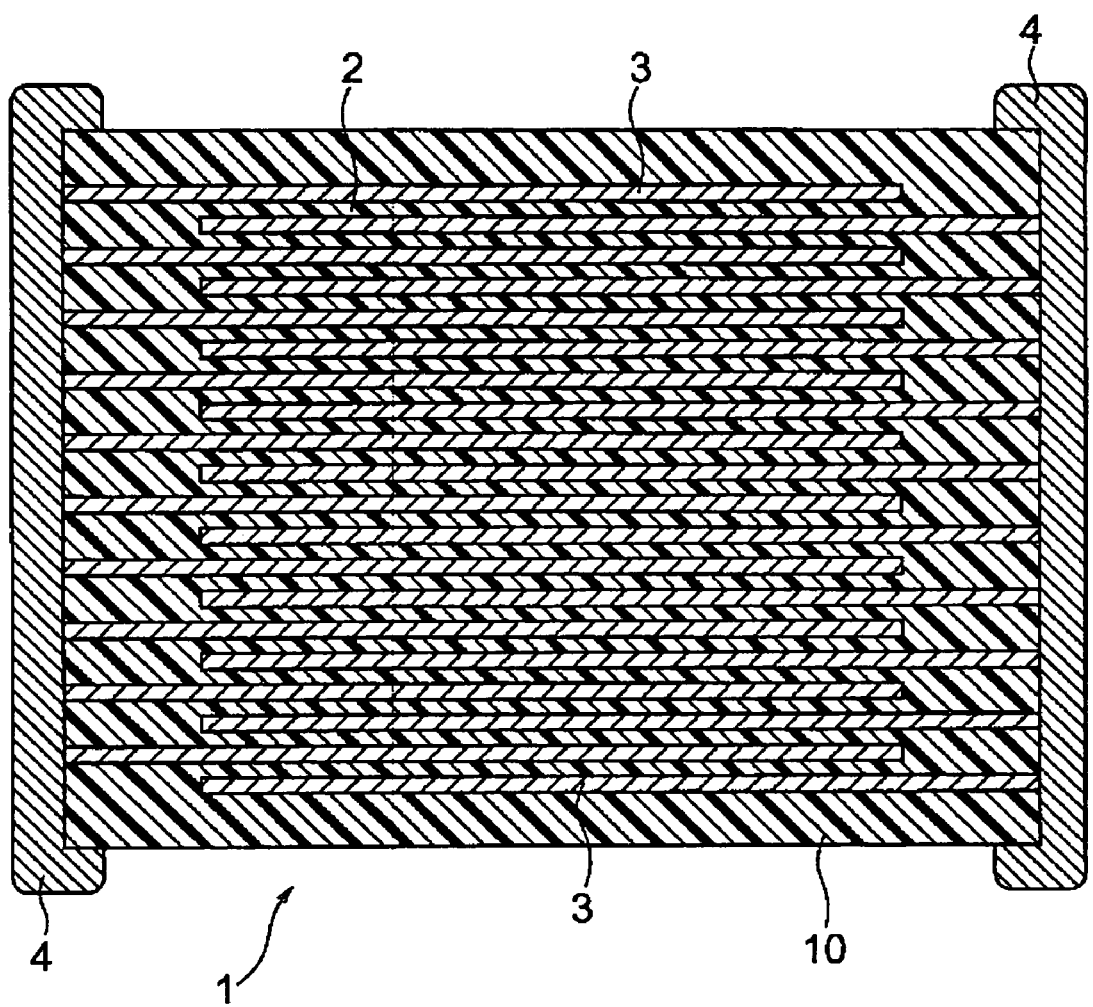
FIG. 1 is a cross-sectional view of a multilayer ceramic capacitor according to an embodiment of the present invention.

As shown in FIG. 1, a multilayer ceramic capacitor 1 as an electronic device according to an embodiment of the present invention has a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. The internal electrode layers 3 are stacked, so that the respective end surfaces are exposed alternately to surfaces of two facing end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

A shape and size of the capacitor element body 10 are not particularly limited and may be suitably set in accordance with the use object, but is normally rectangular parallelepiped and the size may be normally a length (0.4 to 5.6 mm)×width (0.2 to 5.0 mm)×height (0.2 to 1.9 mm) or so.

Dielectric Layer 2

The dielectric layers 2 include the dielectric ceramic composition of the present invention.

The dielectric ceramic composition of the present invention contains a main component including Ba, Ca and Ti, moreover, having a perovskite crystal structure expressed by a general formula of $ABO_3$ and a fifth subcomponent including an oxide of A (note that A is at least one kind selected from a cation element group having an effective ionic radius in a range of 0.065 nm to 0.085 nm at the time of 6 in coordination).

In the present embodiment, a content (solid solution amount) of Ca elements in $ABO_3$ included in the main component is preferably 30 moles or smaller, more preferably 15 moles or larger and 25 moles or smaller, and furthermore preferably 17 moles and 22 moles or smaller with respect to 100 moles of $ABO_3$. When the content of Ca element in $ABO_3$ is too large, the specific permittivity may decline. On the other hand, when the content is too large, a CV value of grain Ca concentration between the crystal grains becomes small and the capacity-temperature characteristics and TC bias characteristics may decline.

A content of the fifth subcomponent above is not particularly limited and the effect can be obtained even with a small content, but it is preferably larger than 0 mole and less than 4 moles, and more preferably 0.5 mole or larger and 3.0 moles or smaller in a value in terms of an oxide of A. Note that when a content of the oxide of A is as little as impurities, for example, when the content is several ppm to tens of ppm or so, it is liable that the effect of adding is not obtained.

The ratio of the fifth subcomponent is a mole ratio of an oxide of A and not a mole ratio of A alone. Namely, for example, when using an oxide of Al as the fifth subcomponent, the ratio of the fifth subcomponent being 1 mole means that a rate of $Al_2O_3$ is one mole, and does not mean that the ratio of Al is 1 mole. Also, when using two or more kinds of elements (oxides) as the fifth subcomponent, it is sufficient if the total content is in the above range with respect to 100 moles of the main component. Namely, a composition ratio of respective oxides in the fifth subcomponent may be any.

The fifth subcomponent has an effect of heightening a CV value of grain Ca concentration between the crystal grains and improving the TC bias and IR temperature dependency. When a content of the fifth subcomponent is too large, the capacity-temperature characteristics tend to decline. While when the fifth subcomponent is not included, the effect of improving the TC bias and IR temperature dependency cannot be obtained, so that reliability declines in the X8R temperature range and it is liable that the stable use becomes impossible.

The cation element group of the fifth subcomponent includes I (0.067 nm), Ge (0.067 nm), Al (0.0675 nm), Cu (0.068 mm), Fe (0.069 nm), Ni (0.070 nm), Au (0.071 nm), As (0.072 nm), Cr (0.0755 nm), Ga (0.076 nm), At (0.076 nm), Os (0.077 nm), Nb (0.078 nm), Ta (0.078 nm), Co (0.079 nm), Rh (0.080 nm), Ir (0.082 nm), Ru (0.082 nm) and Sn (0.083 nm), but P (0.052 nm) and K (0.152 nm) are not included. Note that the number in brackets indicates an effective ionic radius at the time of 6 coordination.

Among the cation element group, Al, Cr, Ga and Ge are preferable, Al, Ga and Ge are more preferable, and Al is particularly preferable.

In the present embodiment, in addition to the fifth subcomponent, preferably, first to fourth subcomponents below are furthermore included and, more preferably, a sixth subcomponent below is furthermore included.

Namely, it is preferable to include a first subcomponent including at least one kind selected from MgO, CaO, BaO and SrO, a second subcomponent serving at least as a sintering auxiliary, a third subcomponent including an oxide of Mn, and a fourth subcomponent including an oxide of R (note that R is at least one kind selected from Sc, Y, La, Ce, Pr, Nd, Pm, Sm, Eu, Gd, Tb, Dy, Ho, Er, Tm, Yb and Lu).

More preferably, a sixth subcomponent including at least one kind selected from $V_2O_5$, $MoO_3$ and $WO_3$ is furthermore included.

Containing ratios of the first to fourth subcomponents and sixth subcomponents with respect to 100 moles of the above main component are preferably first subcomponent: 0.1 to 3 moles,
second subcomponent: 2 to 10 moles,
third subcomponent: 0.1 to 2.5 moles,
fourth subcomponent: 0.1 to 14 moles, and
sixth subcomponent: 0.01 to 0.5 mole; and more preferably,
first subcomponent: 0.5 to 2.5 moles,
second subcomponent: 2.0 to 5.0 moles,
third subcomponent: 0.3 to 1.5 moles,
fourth subcomponent: 0.5 to 10 moles, and
sixth subcomponent: 0.1 to 0.4 mole.

Note that the ratio of the fourth subcomponent above is not a mole ratio of an oxide of R but a mole ratio of R elements alone. For example, when using an oxide of Dy as the fourth subcomponent, a containing ratio of the fourth subcomponent being 1 mole means that a content ratio of Dy elements is 1 mole and does not mean that a ratio of $Dy_2O_3$ is 1 mole.

Also, in this specification, the respective oxides composing the main component and the subcomponents are expressed by stoichiometric compositions, but an oxidation state of each oxide may be deviated from the stoichiometric composition. Note that the above ratios of the subcomponents are obtained by converting a metal amount contained in an oxide composing each subcomponent to the oxide having the above stoichiometric composition.

As a result of including as subcomponents the first to fourth and sixth subcomponents in addition to the fifth subcomponent, the X8R characteristics can be satisfied while maintaining the high permittivity. Preferable contents of the first to fourth and sixth subcomponents are as above, and the reason will be explained below.

The first subcomponent (MgO, CaO, BaO and SrO) exhibits an effect of flattening the capacity-temperature characteristics. When a content of the first subcomponent is too small, the capacity temperature change rate may become large. While, when the content is too much, sinterability may be deteriorated. Note that component ratios of the oxides in the first subcomponent may be any.

As the second subcomponent, a compound including an oxide silicone as a main component is preferable, and at least one kind selected from $SiO_2$, MO (note that M is at least one kind selected from Ba, Ca, Sr and Mg), $Li_2O$ and $B_2O_3$ is more preferable. The second subcomponent acts mainly as a sintering auxiliary and also exhibits an effect of improving a defective rate of initial insulation resistance when forming a thin layer. When a content of the second subcomponent is too small, the capacity-temperature characteristics become poor and the IR (insulation resistance) declines. On the other hand, when the content is too large, the IR lifetime becomes insufficient and an abrupt decline of the permittivity is caused.

Note that, in the present embodiment, as the second subcomponent, a compound expressed by $(Ba, Ca)_x SiO_{2+x}$ (note that "x"=0.7 to 1.2) may be also used. BaO and CaO in $[(Ba, Ca)_x SiO_{2+x}]$ are also included in the first subcomponent, but since $(Ba, Ca)_x SiO_{2+x}$ as a composite oxide has a low melting point and, thus, has preferable reactivity with the main component, BaO and/or CaO may be added as the composite oxide. The "x" in the $(Ba, Ca)_x SiO_{2+x}$ is preferably 0.7 to 1.2, and more preferably 0.8 to 1.1. When the "x" is too small, that is, when $SiO_2$ is too much, it reacts with $BaTiO_3$ as the main component to deteriorate the dielectric property. While when the "x" is too large, the melting point becomes high to deteriorate the sinterability, which is not preferable. Note that a ratio of Ba and Ca may be any, and only one of them may be included.

The third subcomponent (an oxide of Mn) exhibits an effect of accelerating sintering, an effect of heightening the IR, and an effect of improving the IR lifetime. When a content of the third subcomponent is too small, these effects cannot be fully brought out. While when the content is too large, it is liable that an adverse effect is given to the capacity-temperature characteristics.

The fourth subcomponent (an oxide of R) exhibits an effect of shifting the Curie's temperature to the high temperature side, an effect of flattening the capacity-temperature characteristics, and an effect of improving the IR lifetime. When a content of the fourth subcomponent is too small, these effects become insufficient to lead to deterioration of the capacity-temperature characteristics. On the other hand, when the content is too large, the sinterability tends to deteriorate. In the present embodiment, as the R element, Y, Yb, Ho and Dy are preferable for giving a high effect of improving the characteristics.

The sixth subcomponent ($V_2O_5$, $MoO_3$ and $WO_3$) exhibits an effect of flattening the capacity-temperature characteristics at the Curie's temperature or higher and an effect of improving the IR lifetime. When a content of the sixth subcomponent is too small, these effects become insufficient. On the other hand, when the content is too large, the IR declines remarkably. Note that a containing ratio of each oxide in the sixth subcomponent may be any.

The dielectric ceramic composition of the present embodiment is composed of a plurality of crystal grains containing Ca elements. Moreover, when assuming that an average value of a concentration of entire Ca exiting in the respective crystal grains is grain Ca concentration, unevenness of grain Ca concentration between the crystal grains is 5% or larger, preferably 5% or larger but smaller than 20%, and more preferably 10% or larger and 18% or smaller in a CV value. As a result that the unevenness of grain Ca concentration between crystal grains is in a predetermined range as above, the capacity-temperature characteristics can be improved.

Note that unevenness of grain Ca concentration between the crystal grains is evaluated by a CV value calculated by the method below.

Namely, first, grain Ca concentration as an average value of a concentration of entire Ca exiting in the respective crystal grains composing the dielectric composition. Next, an average value "x" of grain Ca concentration and a standard deviation σ of grain Ca concentration between the crystal grains are calculated. Then, the evaluation is made by a CV value obtained from the average value "x" and the standard deviation a by the formula (2) blow. Namely, when the CV value is large (that is, when a value of the standard deviation σ as an index of unevenness is large), it means that unevenness of grain Ca concentration between crystal grains is large. While when the CV value is small (that is, a value of the standard deviation σ as an index of unevenness is small), it means unevenness of grain Ca concentration between crystal grains is small.

$CV$ value [%]=(standard deviation σ of grain $Ca$ concentration/average value "$x$" of grain $Ca$ concentration)×100     (2)

As a specific method of measuring the CV value, for example, the measuring method below may be mentioned.

Namely, first, in a dielectric ceramic composition, an average value of concentration of entire Ca exiting in the respective crystal grains (an average value of a solid solution amount of Ca) included in a certain range (for example, a range of 1.5 μm×1.5 μm) is obtained by measuring by the energy dispersive X-ray spectrometry by using a transmission electron microscope. Then, from measured grain Ca concentration of all crystal grains, an average value "x" of grain Ca concentration and standard deviation a between crystal grains included in the above predetermined range are calculated. From the average value "x" and the standard deviation σ, the CV value can be obtained by the above formula (2). Note that, in the present invention, an average value of a concentration of entire Ca exiting in the respective crystal grains (grain Ca concentration) means Ca concentration in a entire crystal grain and what obtained by averaged Ca concentration from near the grain surface part to the grain center part, that is, in the entire grain.

An average crystal grain diameter of crystal grains composing a dielectric ceramic composition is not particularly limited and may be suitably determined, for example, in a range of 0.1 to 3 μm in accordance with a thickness of the dielectric layer, etc.

Capacity-temperature characteristics tend to deteriorate as the dielectric layers become thinner and as the average crystal grain diameter becomes smaller. Therefore, the dielectric ceramic composition of the present invention is particularly effective when an average crystal grain diameter has to be smaller, specifically, when the average crystal grain diameter is made to be 0.1 to 0.5 μm. By making the average crystal grain diameter of crystal grains smaller, the IR lifetime can become long and changes of the capacity over time under a direct-current electric field can be less. Therefore, the average crystal grain diameter is preferably made as small as 0.1 to 0.5 μm or so.

Also, the Curie's temperature (a phase transition temperature from ferroelectric to paraelectric) of the dielectric ceramic composition of the present embodiment can be changed by selecting the composition, and it is preferably 120° C. or higher, and more preferably 123° C. or higher for satisfying the XBR characteristics. A Curie's temperature can be measured by a differential scanning calorimetry (DSC), etc.

A thickness of the dielectric layer 2 is not particularly limited, but preferably 4.5 μm or thinner per one layer, more preferably 3.5 μm or thinner, and furthermore preferably 3.0 μm or thinner. The lower limit of the thickness is not particularly limited, but is, for example, 0.5 μm or so.

The number of stacked layers of the dielectric layers 2 is not particularly limited, but is preferably 20 or larger, more preferably 50 or larger, and particularly preferably 100 or larger. The upper limit of the number of stacked layers is not particularly limited, but is, for example, 2000 or so.

Internal Electrode Layer 3

A conductive material included in the internal electrode layer 3 is not particularly limited, but since components of the dielectric layer 2 has reduction-resistance, base metals may be used. As base metals to be used as the conductive material, Ni or a Ni alloy are preferable. As the Ni alloy, an alloy of one or more kinds of elements selected from Mn, Cr, Co and Al with Ni is preferable, and a content of Ni in the alloy is preferably 95 wt % or more. Note that the Ni or Ni alloy may contain various trace components, such as P, in an amount of not more than 0.1 wt % or so.

A thickness of the internal electrode layer 3 may be suitably determined in accordance with the use object, etc., but normally it is preferably 0.5 to 5 μm, and particularly 0.5 to 2.5 μm or so.

External Electrode 4

A conductive material included in the external electrode 4 is not particularly limited, but inexpensive Ni, Cu and alloys of these may be used in the present invention.

A thickness of the external electrode 4 may be suitably determined in accordance with the use object, etc., but normally 10 to 50 μm or so is preferable.

Production Method of Multilayer Ceramic Capacitor 1

A multilayer ceramic capacitor 1 including the dielectric ceramic composition of the present invention is produced by preparing a green chip by the normal printing method and sheet method using a paste, firing the same, then, printing or transferring external electrodes and firing in the same way as in a multilayer ceramic capacitor of the related art. Below, the production method will be explained specifically.

First, dielectric ceramic composition powder included in the dielectric layer paste is fabricated.

In the present embodiment, the dielectric ceramic composition powder is fabricated by preparing the above main component materials and subcomponent materials (fifth subcomponent material, preferably, first to fourth subcomponent materials, and more preferably sixth subcomponent materials) and mixing the materials. Contents of the main component materials and subcomponent materials in the dielectric ceramic composition powder may be determined so as to obtain a composition of the above dielectric ceramic composition explained above after firing.

In the present embodiment, it is preferable that main component materials including a compound including Ba, Ca and Ti and having a perovskite crystal structure expressed by a general formula $ABO_3$ is used. As main component materials as such, specifically, it is preferable to use a composite oxide expressed by $Ba_{1-x}Ca_xTiO_3$ obtained by mixing oxides of Ba, Ca and Ti and/or compounds, which become these oxides by being fired, at a predetermined ratio and preliminarily firing in the air. Particularly, as the main component materials, it is preferable to prepare a plurality of composite oxides expressed by $Ba_{1-x}Ca_xTiO_3$ having different "x" values and mixing them to use. For example, it is possible to mix three kinds of composite oxides, $Ba_{0.9}Ca_{0.1}TiO_3$, $B_{0.8}Ca_{0.2}TiO_3$ and $Ba_{0.7}Ca_{0.3}TiO_3$ for use.

In the present embodiment, it is preferable to mix two or more and, more preferably, three or more kinds of $Ba_{1-x}Ca_xTiO_3$ having different "x" values for use. By using such main component materials, unevenness of grain Ca concentration between crystal grains after firing can be made large.

Also, in the present embodiment, the main component materials preferably include a $Ba_{1-x}Ca_xTiO_3$ powder, wherein "x" is 0.2 or larger, more preferably a $Ba_{1-x}Ca_xTiO_3$ powder, wherein "x" is 0.25 or larger, furthermore preferably a $Ba_{1-x}Ca_xTiO_3$ powder, wherein "x" is 0.27 or larger, and particularly preferably a $Ba_{1-x}Ca_xTiO_3$ powder, wherein "x" is 0.3 or so.

As materials of the subcomponents (fifth subcomponent materials, preferably first to fourth subcomponent materials, and more preferably sixth subcomponent materials), the above oxides, mixtures thereof, and composite oxides may be used, and also it may be suitably selected from a variety of compounds to be the above oxides, and composite oxides by firing, such as carbonate, oxalate, nitrate, hydroxide and organic metal compound, etc., and mixed for use.

Note that, in the present embodiment, to obtain the dielectric ceramic composition powder by mixing the main component materials and subcomponent materials, a step of performing calcining the main component materials and fifth subcomponent materials, milling the result, and adding other subcomponents (for example, first to fourth subcomponents) may be used. By performing calcining on the main component materials and the fifth subcomponent materials, the fifth subcomponent can be efficiently solid dispersed in the main component, so that a CV value of grain Ca concentration between crystal grains can be heightened, and the TC bias characteristics and IR temperature dependency can be improved.

The calcining is not particularly limited and may be performed under a condition where the fifth subcomponent is solid dispersed in the main component. Preferably, the calcining temperature is 500 to 1000° C., and more preferably 600 to 800° C., and the calcining time is 2 to 6 hours, and more preferably 3 to 5 hours. When the calcining temperature is low or the calcining time is short, it is liable that the effect by the calcining cannot be obtained. On the other hand, when the calcining temperature is too high or the calcining time is to long, a CV value of grain Ca concentration becomes too large and the capacity-temperature characteristics tend to decline.

Next, by using the obtained dielectric ceramic composition powder, dielectric layer paste is produced. The dielectric layer paste may be organic based slurry obtained by kneading the dielectric ceramic composition powder with an organic vehicle or water based slurry.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as the printing method and sheet method.

Also, when using water based slurry as dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive material after firing, with the above organic vehicle.

The external electrode paste may be fabricated in the same way as the above internal electrode layer paste.

A content of the organic vehicle in the above variety of pastes is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using the printing method, the dielectric layer paste and the internal electrode layer paste are stacked and printed on a substrate, such as PET, cut to be a predetermined shape and removed from the substrate to obtain a green chip.

When using the sheet method, the dielectric layer paste is used to form a green sheet, the internal electrode layer paste is printed thereon, then, the results are stacked to obtain a green chip.

Before firing, binder removal processing is performed on the green chip. The binder removal processing may be suitably determined in accordance with a kind of a conductive material in the internal electrode layer paste, and when using Ni, a Ni alloy or other base metal as the conductive material, the oxygen partial pressure in the binder removal atmosphere is preferably $10^{-45}$ to $10^5$ Pa. When the oxygen partial pressure is lower than the above range, the binder removal effect declines. While, when the oxygen partial pressure exceeds the above range, the internal electrode layer tends to be oxidized.

Also, as other binder removal conditions, the temperature raising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the firing atmosphere is preferably in the air or a reducing atmosphere, and a preferable atmosphere gas in the reducing atmosphere is, for example, a wet mixed gas of $N_2$ and $H_2$.

An atmosphere at firing the green chip may be suitably determined in accordance with a kind of a conductive material in the internal electrode layer paste, and when using Ni, a Ni alloy or other base metal as the conductive material, the oxygen partial pressure in the firing atmosphere is preferably $10^{-7}$ to $10^{-3}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1100 to 1400° C., more preferably 1200 to 1380° C., and furthermore preferably 1260 to 1360° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably 0.1 Pa or higher, and particularly preferably 0.1 to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1100° C. or lower, and particularly preferably 500 to 1100° C. When the holding temperature is lower than the above range, oxidization of the dielectric layer becomes insufficient, so that the IR becomes low and the IR lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the IR lifetime are easily caused. Note that the annealing may be composed only of a temperature rising step and a temperature lowering step. Namely, the temperature holding time may be zero. In this case, the holding temperature is a synonym of the highest temperature.

As other annealing conditions, the temperature holding time is preferably 0 to 20 hours and more preferably 2 to 10 hours, and the cooling rate is preferably 50 to 500° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so.

The binder removal processing, firing and annealing may be performed continuously or separately. When performing continuously, the atmosphere is changed without cooling after the binder removal processing, continuously, the temperature is raised to the holding temperature at firing to perform firing. Next, it is cooled and the annealing is preferably performed by changing the atmosphere when the temperature reaches to the holding temperature of the annealing. On the other hand, when performing them separately, at the time of firing, after raising the temperature to the holding temperature of the binder removal processing in an atmosphere of a nitrogen gas or a wet nitrogen gas, the atmosphere is changed, and the temperature is preferably furthermore raised. After that, after cooling the temperature to the holding temperature of the annealing, it is preferable that the cooling continues by changing the atmosphere again to a nitrogen gas or a wet nitrogen gas. Also, in the annealing, after raising the temperature to the holding temperature under the nitrogen gas atmosphere, the atmosphere may be changed, or the entire process of the annealing may be in a wet nitrogen gas atmosphere.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

Since the multilayer ceramic capacitor 1 of the present embodiment includes dielectric layers 2 using the dielectric ceramic composition of the present invention, capacity-temperature characteristics can satisfy the X8R characteristics (−55 to 150° C., ΔC=within ±15%) of the EIA standard. Therefore, it can be preferably used as an electronic device for an apparatus used under an environment of 80° C. or higher, particularly 125 to 150° C. Also, the multilayer ceramic capacitor 1 of the present embodiment can satisfy the B characteristics [a capacity change rate is ±10% at −25 to 85° C. (the reference temperature is 20° C.)] of the EIAJ standard and the X7R characteristics (−55 to 125° C., ΔC=within ±15%) of the EIA standard at the same time.

Moreover, in the multilayer ceramic capacitor 1 of the present embodiment, when assuming that insulation resistance at the room temperature (25° C.) and that at a high temperature part (150° C.) are respectively $IR_{25}$ and $IR_{150}$, "a loss of significant digits of IR" expressed by the formula (1) below can be −3.00 or higher. Therefore, the IR temperature dependency is small and it can be used stably even under a high temperature environment of 80° C. or higher, particularly 125 to 150° C.

$$\log(IR_{150}/IR_{25}) \qquad (1)$$

Also, the multilayer ceramic capacitor 1 of the present embodiment has preferable TC bias characteristics (capacity-temperature characteristics when applying a direct-current voltage). Therefore, it is highly reliable in a wide temperature range.

An embodiment of the present invention was explained above, but the present invention is not limited to the above embodiment and may be variously modified within the scope of the present invention.

For example, in the above embodiment, a multilayer ceramic capacitor was taken as an example of an electronic device according to the present invention, but the electronic device according to the present invention is not limited to a multilayer ceramic capacitor and may be any as far as it includes a dielectric layer composed of the dielectric ceramic composition having the above composition.

EXAMPLES

Below, the present invention will be explained based on further detailed examples, but the present invention is not limited to the examples.

Example 1

First, three kinds of compounds ($Ba_{0.9}Ca_{0.1}TiO_3$, $Ba_{0.8}Ca_{0.2}TiO_3$ and $Ba_{0.7}Ca_{0.3}TiO_3$) including Ba, Ca and Ti and having a perovskite crystal structure expressed by a general formula of $ABO_3$ were prepared as main component materials. In the present example, the three kinds of main component materials were produced by mixing powders of $BaCO_3$, $CaCO_3$ and $TiO_2$ in predetermined amounts so as to obtain the above compositions, respectively, then, performing calcining thereon and milling the results.

Then, the above three kinds of main component materials were added with $Al_2O_3$ (a fifth subcomponent) and later explained first to fourth subcomponents, wet mixed and milled by a ball mill to form slurry, so that dielectric layer paste was fabricated. Note that, in the present example, mole ratio of the above three kinds of main component materials was $Ba_{0.9}Ca_{0.1}TiO_3:Ba_{0.8}Ca_{0.2}TiO_3: Ba_{0.7}Ca_{0.3}TiO_3=1:1:1$. Namely, in the present example, a content of Ca elements was adjusted to 0.2 mole with respect to 100 moles of $ABO_3$.

The first to fourth subcomponents were as below.

MgO (first subcomponent): 1.1 mole
$SiO_2$ (second subcomponent): 3.4 moles
MnO (third subcomponent): 0.56 mole
$Dy_2O_3$ (fourth subcomponent): 1 mole Note that the adding quantities of the first to fourth subcomponents above are indicated in terms of the respective oxides with respective to a total of 100 moles of the three main component materials. Note that an adding quantity of $Dy_2O_3$ as the fourth subcomponent is indicated by number of moles in terms of Dy atoms. Namely, an adding quantity in terms of $Dy_2O_3$ is 0.5 mole.

Also, in this example, an adding quantity of $Al_2O_3$ as the fifth subcomponent was changed in a range of 0 to 4 moles with respect to a total of 100 moles of the three kinds of main component materials to produce a plurality of samples.

100 parts by weight of the dielectric ceramic composition powder obtained as above, 4.8 parts by weight of an acrylic resin, 100 parts by weight of ethyl acetate, 6 parts by weight of mineral spirit and 4 parts by weight of toluene were mixed by a ball mill to form paste, so that dielectric layer paste was obtained.

Next, 44.6 parts by weight of Ni particles, 52 parts by weight of terpineol, 3 parts by weight of ethyl cellulose and 0.4 part by weight of benzotriazole were kneaded by a triple-roll to form slurry, so that internal electrode layer paste was obtained.

By using these pastes, a multilayer ceramic chip capacitor 1 shown in FIG. 1 was produced as below.

First, by using the obtained dielectric layer paste, a green sheet was formed on a PET film. After printing the internal electrode paste thereon, the sheet was removed from the PET film. Next, such green sheets and protective green sheets (the internal electrode paste is not printed thereon) were stacked, pressed to bond, so that a green chip was obtained.

Next, the green chip was cut to be a predetermined size and subjected to binder removal processing, firing and annealing under conditions below so as to obtain a multilayer ceramic sintered body.

The binder removal processing condition was a temperature raising rate of 32.5° C./hour, a holding temperature of 260° C., temperature holding time of 8 hours, and an atmosphere being in the air.

The firing condition was a temperature raising rate of 200° C./hour, a holding temperature of 1250° C., temperature holding time of 2 hours, cooling rate of 200° C./hour and an atmosphere of wet mixed gas of $N_2+H_2$ (oxygen partial pressure was $10^{-7}$ Pa).

The annealing condition was a temperature raising rate of 200° C./hour, a holding temperature of 1050° C., temperature holding time of 2 hours, cooling rate of 200° C./hour and an atmosphere of wet $N_2$ gas (oxygen partial pressure was 1.01 Pa).

Note that a wetter with a water temperature of 20° C. was used to wet the atmosphere gases in firing and annealing.

Next, after polishing end surfaces of the obtained multilayer ceramic sintered body by sandblasting, In—Ga was applied as external electrodes, so that samples 1 to 6 of the multilayer ceramic capacitor of the example 1 shown in FIG. 1 were obtained. Note that a content of $Al_2O_3$ was changed in a range of 0 to 4 moles as shown in Table 1 in the capacitor samples 1 to 6. The sample 1 did not include any $Al_2O_3$.

A size of the obtained capacitor samples was 3.2 mm×1.6 mm×0.6 mm, the number of dielectric layers sandwiched by internal electrode layers was 4, a thickness (a thickness between layers) of one dielectric layer was 4.5 μm, and a thickness of one internal electrode layer was 1.2 μm.

Next, a CV value of grain Ca concentration between crystal grains, capacity-temperature characteristics (Tc), TC bias characteristics and IR temperature dependency (a loss of significant digits) of the obtained capacitor samples were measured by the methods explained below.

A CV value of grain Ca concentration between crystal grains was obtained by measuring an average value of Ca concentration of respective crystal grains (grain Ca concentration) included in a range of 1.5 μm×1.5 μm of a dielectric layer of each of the capacitor samples by the energy dispersive X-ray spectrometry by using a transmission electron microscope. This measurement was made repeatedly on a plurality of scopes, an average value "x" and standard deviation σ of grain Ca concentration between all crystal grains are obtained, and a CV value was calculated from the average value "x" and standard deviation a of grain Ca concentration by the formula (2) below. In this example, 5% or larger, and preferably 5% or larger but smaller than 20% were considered good as the evaluation criteria. The results are shown in Table 1.

$$CV \text{ value } [\%] = (\text{standard deviation } \sigma \text{ of grain } Ca \text{ concentration/average value "}x\text{" of grain } Ca \text{ concentration}) \times 100 \quad (2)$$

Capacity-temperature characteristics (Tc) were evaluated by measuring capacitance of the obtained samples in a temperature range of −55 to 150° C. first. Specifically, the capacitance was measured by using a digital LCR meter (4274A made by YHP) under a condition of a frequency of 1 kHz and an input signal level of 1 Vrms. Then, a capacitance change rate (ΔC/C, the unit is %) was calculated under a temperature environment at 150° C., at which the capacity-temperature characteristics became worst in the temperature range. In this example, samples satisfying ΔC/C=within ±15% in a range of −55 to 150° C. (that is, samples satisfying the X8R characteristics) were considered good.

samples in an electric field of 10 V/μm at 200° C., and time until the insulation resistance becomes 1 MΩ or lower was calculated as the lifetime. As a result, all samples exhibited a preferable result of 10 hours or longer.

The DC bias characteristics were evaluated by measuring a change of capacitance (ΔC/C) when gradually applying a direct current voltage to respective samples at a constant temperature (25° C.). As a result of plotting the measurement results, it was confirmed that the capacitance was hard to decrease even when a high voltage was applied and stable DC bias characteristics were obtained in all samples.

TABLE 1

| Sample No. | Composition Ratio of Main Component Materials (mole ratio) | $Al_2O_3$ Amount [mole] | CV Value [%] | Temperature Characteristics of Capacitance [%] | Tc-Bias [%] | IR Temperature Dependency [%] |
|---|---|---|---|---|---|---|
| 1* | $Ba_{0.9}Ca_{0.1}TiO_3:Ba_{0.8}Ca_{0.2}TiO_3:Ba_{0.7}Ca_{0.3}TiO_3 = 1:1:1$ | 0 | 10 | −10.9 | −50.3 | −3.37 |
| 2 | $Ba_{0.9}Ca_{0.1}TiO_3:Ba_{0.8}Ca_{0.2}TiO_3:Ba_{0.7}Ca_{0.3}TiO_3 = 1:1:1$ | 0.5 | 13 | −11.9 | −46.1 | −2.98 |
| 3 | $Ba_{0.9}Ca_{0.1}TiO_3:Ba_{0.8}Ca_{0.2}TiO_3:Ba_{0.7}Ca_{0.3}TiO_3 = 1:1:1$ | 1 | 14 | −12.3 | −45.3 | −2.91 |
| 4 | $Ba_{0.9}Ca_{0.1}TiO_3:Ba_{0.8}Ca_{0.2}TiO_3:Ba_{0.7}Ca_{0.3}TiO_3 = 1:1:1$ | 2 | 18 | −13.9 | −39.7 | −2.65 |
| 5 | $Ba_{0.9}Ca_{0.1}TiO_3:Ba_{0.8}Ca_{0.2}TiO_3:Ba_{0.7}Ca_{0.3}TiO_3 = 1:1:1$ | 3 | 19.5 | −14.5 | −38.1 | −2.60 |
| 6** | $Ba_{0.9}Ca_{0.1}TiO_3:Ba_{0.8}Ca_{0.2}TiO_3:Ba_{0.7}Ca_{0.3}TiO_3 = 1:1:1$ | 4 | 23 | −16.7 | −36.7 | −2.54 |

A sample marked with "*" is a comparative example and a sample marked with "**" is a reference example of the present invention.

The results are shown in Table 1.

TC bias characteristics were measured on the obtained samples by a digital LCR meter (4274A made by YHP) at 1 kHz, 1 Vrms and a bias voltage (direct current voltage) of 7.0 V/μm by changing temperature from −55° C. to 150° C. and evaluated by calculating a change rate of the capacitance from the measurement value at the time of not applying a bias voltage at 25° C. Note that an LCR meter was used for measuring the capacitance, and the measurement was made under a condition of a frequency of 1 kHz and an input signal level of 1 Vrms. Those exhibited −50% or higher were determined to be good. The results are shown in Table 1.

IR temperature dependency (a loss of significant digits) was evaluated by measuring insulation resistance $IR_{150}$ at 150° C. and insulation resistance $IR_{25}$ at 25° C. of the obtained samples and calculating a loss of significant digits expressed by the formula (1) below. In this example, −3.00 or higher was determined to be good. The results are shown in Table 1.

$$\log(IR_{150}/IR_{25}) \quad (1)$$

Furthermore, in this example, in addition to the above, specific permittivity (ε), dielectric loss (tan δ), IR lifetime in a direct-current electric field, and DC bias characteristics were also evaluated on the obtained capacitor samples.

The specific permittivity ε (no unit) was calculated from capacitance measured under a condition of the reference temperature of 25° C. by using a digital LCR meter (4274A made by YHP), a frequency of 1 kHz and an input signal level (measurement voltage) of 1.0 Vrms. As a result, all samples exhibited a preferable result of 1000 or higher.

The dielectric loss (tan δ) was measured on the capacitor samples under a condition of the reference temperature of 25° C. by using a digital LCR meter (4274A made by YHP), a frequency of 1 kHz and an input signal level (measurement voltage) of 1.0 Vrms. As a result, all samples exhibited a preferable result of 3.0% or lower.

The IR lifetime in the direct current electric field was obtained by conducting an acceleration test on the capacitor From Table 1, the samples 2 to 5 as the example having a predetermined composition of the main component and subcomponent and including more than 0 mole but less than 4 moles of an oxide of Al elements ($Al_2O_3$) having an ionic radius of 0.0675 nm are confirmed that the capacity-temperature characteristics satisfy the X8R characteristics and the TC bias and IR temperature dependency (a loss of significant digits) are excellent. Note that, in this example, a content of Ca elements in $ABO_3$ was 20 moles with respect to 100 moles of $ABO_3$.

On the other hand, the sample 1 as a comparative example not including $Al_2O_3$ exhibited poor results in the TC bias characteristics and IR temperature dependency (a loss of significant digits). Also, in the sample 6 as a reference example containing 4 moles of $Al_2O_3$, the CV value of grain Ca concentration became 23%, which was too high, and the result was that the capacity-temperature characteristics did not satisfy the X8R characteristics.

From the above results, it was confirmed that, by having a predetermined composition of the main component and subcomponents and including an oxide of a certain element having an ionic radius of 0.065 nm to 0.085 nm in a predetermined amount, the capacity-temperature characteristics can satisfy the X8R characteristics and the TC bias and IR temperature dependency (a loss of significant digits) can be improved.

Examples 2 to 4

Other than using $Cr_2O_3$ (example 2), $GaO_2$ (example 3) and $Ge_2O_3$ (example 4) instead of $Al_2O_3$ as the fifth subcomponent, dielectric layer paste was produced in the same way as in the example 1, and capacitor samples 7 to 11 (example 2), 12 to 16 (example 3) and 17 to 21 (example 4) were produced in the same way as in the example 1. The respective characteristics were measured on the obtained capacitor samples in the same way as in the example 1.

TABLE 2

| Sample No. | Composition Ratio of Main Component Materials (mole ratio) | $Cr_2O_3$ Amount [mole] | CV Value [%] | Temperature Characteristics of Capacitance [%] | Tc-Bias [%] | IR Temperature Dependency [%] |
|---|---|---|---|---|---|---|
| 1* | $Ba_{0.9}Ca_{0.1}TiO_3$:$Ba_{0.8}Ca_{0.2}TiO_3$:$Ba_{0.7}Ca_{0.3}TiO_3$ = 1:1:1 | 0 | 10 | −10.9 | −50.3 | −3.37 |
| 7 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 0.5 | 12.9 | −11.3 | −47.5 | −2.99 |
| 8 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 1 | 13.7 | −11.8 | −46.9 | −2.94 |
| 9 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 2 | 17.5 | −13.4 | −41.5 | −2.7 |
| 10 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 3 | 19.0 | −14.1 | −40.2 | −2.67 |
| 11** | $Ba_{0.9}Ca_{0.1}TiO_3$:$Ba_{0.8}Ca_{0.2}TiO_3$:$Ba_{0.7}Ca_{0.3}TiO_3$ = 1:1:1 | 4 | 22.1 | −16.4 | −38.6 | −2.63 |

A sample marked with "*" is a comparative example and a sample marked with "**" is a reference example of the present invention.

TABLE 3

| Sample No. | Composition Ratio of Main Component Materials (mole ratio) | $GaO_2$ Amount [mole] | CV Value [%] | Temperature Characteristics of Capacitance [%] | Tc-Bias [%] | IR Temperature Dependency [%] |
|---|---|---|---|---|---|---|
| 1* | $Ba_{0.9}Ca_{0.1}TiO_3$:$Ba_{0.8}Ca_{0.2}TiO_3$:$Ba_{0.7}Ca_{0.3}TiO_3$ = 1:1:1 | 0 | 10 | −10.9 | −50.3 | −3.37 |
| 12 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 0.5 | 12.8 | −11.6 | −46.3 | −2.99 |
| 13 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 1 | 13.7 | −12.1 | −45.7 | −2.93 |
| 14 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 2 | 17.5 | −13.7 | −40.1 | −2.67 |
| 15 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 3 | 19.2 | −14.3 | −39.7 | −2.60 |
| 16** | $Ba_{0.9}Ca_{0.1}TiO_3$:$Ba_{0.8}Ca_{0.2}TiO_3$:$Ba_{0.7}Ca_{0.3}TiO_3$ = 1:1:1 | 4 | 22.7 | −16.6 | −37.1 | −2.55 |

A sample marked with "*" is a comparative example and a sample marked with "**" is a reference example of the present invention.

TABLE 4

| Sample No. | Composition Ratio of Main Component Materials (mole ratio) | $Ge_2O_3$ Amount [mole] | CV Value [%] | Temperature Characteristics of Capacitance [%] | Tc-Bias [%] | IR Temperature Dependency [%] |
|---|---|---|---|---|---|---|
| 1* | $Ba_{0.9}Ca_{0.1}TiO_3$:$Ba_{0.8}Ca_{0.2}TiO_3$:$Ba_{0.7}Ca_{0.3}TiO_3$ = 1:1:1 | 0 | 10 | −10.9 | −50.3 | −3.37 |
| 17 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 0.5 | 12.5 | −11.9 | −47 | −2.99 |
| 18 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 1 | 13.6 | −12.2 | −46.3 | −2.93 |
| 19 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 2 | 17.8 | −13.8 | −40.8 | −2.68 |
| 20 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 3 | 19.6 | −14.6 | −39.5 | −2.65 |
| 21** | $Ba_{0.9}Ca_{0.1}TiO_3$:$Ba_{0.8}Ca_{0.2}TiO_3$:$Ba_{0.7}Ca_{0.3}TiO_3$ = 1:1:1 | 4 | 22.5 | −16.7 | −37.8 | −2.61 |

A sample marked with "*" is a comparative example and a sample marked with "**" is a reference example of the present invention.

As shown in Table 2 to Table 4, it was confirmed that the same results can be obtained also in the cases of changing $Al_2O_3$ to $Cr_2O_3$ (example 2), $GaO_2$ (example 3) and $Ge_2O_3$ (example 4). Note that the sample 1 is the same as the samples produced in the example 1 and includes none of $Cr_2O_3$, $GaO_2$ and $Ge_2O_3$.

From the results, it is confirmed that the same effects as those in using $Al_2O_3$ can be obtained also in the cases of changing $Al_2O_3$ to $Cr_2O_3$, $GaO_2$ and $Ge_2O_3$.

Example 5

Other than using as the main component materials those obtained by mixing the main component materials shown in Table 5 at mole ratios shown in Table 5, capacitor samples 22 to 26 were produced in the same way as in the sample 3 of the example 1. The respective characteristics of the obtained capacitor samples were measured in the same way as in the example 1. Note that, in this example, contents of Ca elements with respect to 100 moles of $ABO_3$ in the capacitor samples were as shown in Table 5.

TABLE 5

| Sample No. | Composition Ratio of Main Component Materials (mole ratio) | Ca Amount in $ABO_3$ [mole] | $Al_2O_3$ Amount [mole] | CV Value [%] | Temperature Characteristics of Capacitance [%] | Tc-Bias [%] | IR Temperature Dependency [%] |
|---|---|---|---|---|---|---|---|
| 3 | $Ba_{0.9}Ca_{0.1}TiO_3$:$Ba_{0.8}Ca_{0.2}TiO_3$:$Ba_{0.7}Ca_{0.3}TiO_3$ = 1:1:1 | 20 | 1 | 14 | −12.3 | −45.3 | −2.91 |
| 22 | $Ba_{0.9}Ca_{0.1}TiO_3$:$Ba_{0.8}Ca_{0.2}TiO_3$ = 1:2 | 16.7 | 1 | 12.1 | −12.8 | −46.3 | −2.88 |
| 23 | $Ba_{0.9}Ca_{0.1}TiO_3$:$Ba_{0.8}Ca_{0.2}TiO_3$ = 2:1 | 13.3 | 1 | 11.7 | −13.6 | −47.8 | −2.85 |

TABLE 5-continued

| Sample No. | Composition Ratio of Main Component Materials (mole ratio) | Ca Amount in $ABO_3$ [mole] | $Al_2O_3$ Amount [mole] | CV Value [%] | Temperature Characteristics of Capacitance [%] | Tc-Bias [%] | IR Temperature Dependency [%] |
|---|---|---|---|---|---|---|---|
| 24 | $Ba_{0.9}Ca_{0.1}TiO_3:Ba_{0.8}Ca_{0.2}TiO_3:Ba_{0.95}Ca_{0.05}TiO_3 = 1:1:1$ | 11.7 | 1 | 10.9 | −14 | −48.1 | −2.83 |
| 25 | $Ba_{0.9}Ca_{0.1}TiO_3:Ba_{0.8}Ca_{0.2}TiO_3 = 1:1$ | 15 | 1 | 7.8 | −14.3 | −48.8 | −2.8 |
| 26* | $Ba_{0.9}Ca_{0.1}TiO_3$ | 10 | 1 | 4.9 | −16.7 | −55 | −2.79 |

A sample marked with "*" is a comparative example of the present invention.

From Table 5, it is confirmed that, in all of the sample 3 and 22 to 25 as examples, wherein a content of Ca elements with respect to 100 moles of $ABO_3$ is 10 moles or larger and 30 moles or smaller, the capacity-temperature characteristics satisfy the X8R and the TC bias and IR temperature dependency (a loss of significant digits) are excellent.

On the other hand, in the sample 26 as a comparative example, wherein a content of Ca elements with respect to 100 moles of $ABO_3$ was 10 moles, the CV value of grain Ca concentration became low as 4.9%, consequently, it exhibited poor results that the capacity-temperature characteristics did not satisfy the X8R characteristics and the TC bias characteristics became poor.

Example 6

Other than producing dielectric layer paste by mixing the main component materials and $Al_2O_3$ as the fifth subcomponent in advance, performing calcining thereon at a temperature of 700° C. for 2 to 8 hours, milling the result, then, adding the first to fourth subcomponents and mixing; capacitor samples 27 to 29 were produced in the same way as in the sample 3 of the example 1. The respective characteristics were measured on the obtained capacitor samples in the same way as in the example 1.

TABLE 6

| Sample No. | Composition Ratio of Main Component Materials (mole ratio) | $Al_2O_3$ Amount [mole] | Preliminary Firing Condition Temperature [° C.] | Time [h] | CV Value [%] | Temperature Characteristics of Capacitance [%] | Tc-Bias [%] | IR Temperature Dependency [%] |
|---|---|---|---|---|---|---|---|---|
| 3 | $Ba_{0.9}Ca_{0.1}TiO_3:Ba_{0.8}Ca_{0.2}TiO_3:Ba_{0.7}Ca_{0.3}TiO_3 = 1:1:1$ | 1 | — | — | 14 | −12.3 | −45.3 | −2.91 |
| 27 | $Ba_{0.9}Ca_{0.1}TiO_3:Ba_{0.8}Ca_{0.2}TiO_3:Ba_{0.7}Ca_{0.3}TiO_3 = 1:1:1$ | 1 | 700 | 2 | 15 | −13.2 | −44.1 | −2.81 |
| 28 | $Ba_{0.9}Ca_{0.1}TiO_3:Ba_{0.8}Ca_{0.2}TiO_3:Ba_{0.7}Ca_{0.3}TiO_3 = 1:1:1$ | 1 | 700 | 4 | 17 | −14.6 | −43.3 | −2.71 |
| 29** | $Ba_{0.9}Ca_{0.1}TiO_3:Ba_{0.8}Ca_{0.2}TiO_3:Ba_{0.7}Ca_{0.3}TiO_3 = 1:1:1$ | 1 | 700 | 8 | 20 | −16.7 | −44.5 | −2.71 |

A sample marked with "**" is a reference example of the present invention.

From Table 6, when comparing the sample 3 with the samples 27 and 28, it is confirmed that the TC bias characteristics and IR temperature dependency can be furthermore improved by performing calcining under a predetermined condition. Note that, from the result of the sample 29, it is confirmed that the CV value of grain Ca concentration becomes too large and the capacity-temperature characteristics cannot satisfy the X8R characteristics when the calcining is too long.

What is claimed is:

1. A dielectric ceramic composition, comprising:
   a main component including Ba, Ca and Ti and having a perovskite crystal structure expressed by a general formula $ABO_3$, and
   a fifth subcomponent being an oxide of Al in an amount of 1.0 mole to 3.0 moles with respect to 100 moles of the main component;
   wherein:
   said dielectric ceramic composition is composed of a plurality of crystal grains including Ca elements; and
   when assuming that an average value of a concentration of entire Ca exiting in said respective crystal grains is grain Ca concentration, at least unevenness exists in said grain Ca concentration between said crystal grains and it is 5% or higher in a CV value.

2. The dielectric ceramic composition as set forth in claim 1, wherein unevenness of said grain Ca concentration between said crystal grains is 5% or higher but less than 20% in CV value.

3. The dielectric ceramic composition as set forth in claim 1, wherein a content of said fifth subcomponent is larger than 0 mole and smaller than 4 moles in terms of an oxide of A with respect to 100 moles of said main component.

4. The dielectric ceramic composition as set forth in claim 1, wherein a content of Ca elements in said dielectric ceramic composition is 30 mole or smaller with respect to 100 moles of said $ABO_3$.

5. The dielectric ceramic composition as set forth in claim 1, further comprising:
   a first subcomponent including at least one oxide selected from the group consisting of MgO, CaO, BaO and SrO;
   a second subcomponent functioning at least as a sintering auxiliary;
   a third subcomponent including an oxide of Mn; and
   a fourth subcomponent including an oxide of R wherein R is at least one element selected from the group consisting of Sc, Y, La, Ce, Pr, Nd, Pm, Sm, Eu, Gd, Tb, Dy, Ho, Er, Tm, Yb and Lu.

6. The dielectric ceramic composition as set forth in claim 5, wherein said second subcomponent includes a compound including oxide silicon as a main component.

7. The dielectric ceramic composition as set forth in claim 5, wherein ratios of said first to fourth subcomponent with respect to 100 moles of said main component are:
first subcomponent: 0.1 to 3 moles,
second subcomponent: 2 to 10 moles,
third subcomponent: 0.1 to 2.5 moles, and
fourth subcomponent: 0.1 to 14 moles wherein the number of moles of the fourth subcomponent is a ratio of R alone.

8. The dielectric ceramic composition as set forth in claim 1, further comprising 0.01 to 0.5 mole of a sixth subcomponent including at least one oxide selected from the group consisting of $V_2O_5$, $MoO_3$ and $WO_3$ with respect to 100 moles of said main component.

9. An electronic device having a dielectric layer composed of the dielectric ceramic composition as set forth in claim 1.

10. A multilayer ceramic capacitor having a capacitor element body, wherein dielectric layers composed of the dielectric ceramic composition as set forth in claim 1 and internal electrode layers are alternately stacked.

11. A dielectric ceramic composition, comprising:
a main component including Ba, Ca and Ti and having a perovskite crystal structure expressed by a general formula $ABO_3$, and
a fifth subcomponent being an oxide of Cr in an amount of 0.5 mole to 3.0 moles with respect to 100 moles of the main component;
wherein:
said dielectric ceramic composition is composed of a plurality of crystal grains including Ca elements; and
when assuming that an average value of a concentration of entire Ca exiting in said respective crystal grains is grain Ca concentration, at least unevenness exists in said grain Ca concentration between said crystal grains and it is 5% or higher in a CV value.

12. A dielectric ceramic composition, comprising:
a main component including Ba, Ca and Ti and having a perovskite crystal structure expressed by a general formula $ABO_3$, and
a fifth subcomponent being selected from the group consisting of an oxide of Ga, and oxide of Ge;
wherein:
said dielectric ceramic composition is composed of a plurality of crystal grains including Ca elements; and
when assuming that an average value of a concentration of entire Ca exiting in said respective crystal grains is grain Ca concentration, at least unevenness exists in said grain Ca concentration between said crystal grains and it is 5% or higher in a CV value.

* * * * *